(12) United States Patent
Oda et al.

(10) Patent No.: US 6,293,984 B1
(45) Date of Patent: Sep. 25, 2001

(54) AIR FILTER

(75) Inventors: Kouichi Oda; Hidehito Ukai; Katsuyuki Shirai; Minoru Honda, all of Kariya; Takashi Nishimoto, Toyota; Jin Hashioka, Toyota; Kenjiro Morota, Toyota, all of (JP)

(73) Assignee: Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 09/369,886

(22) Filed: Aug. 9, 1999

(30) Foreign Application Priority Data

Aug. 21, 1998 (JP) .................................................. 10-235934

(51) Int. Cl.⁷ .................................................. B01D 46/52
(52) U.S. Cl. .................. 55/497; 55/502; 55/503; 55/511; 55/521
(58) Field of Search .................. 55/385.3, 497, 55/500, 502, 503, 504, 509, 511, 521, 524, 528, DIG. 5; 95/273; 210/493.1, 493.5; 123/198 E (56) References Cited

U.S. PATENT DOCUMENTS

| | | |
|---|---|---|
| 1,890,499 | 12/1932 | Davids . |
| 3,017,698 | 1/1962 | Hambrecht et al. . |
| 3,834,134 * | 9/1974 | McAllister .......................... 55/502 |
| 4,929,263 * | 5/1990 | Kasugai ............................ 55/502 |
| 5,605,554 * | 2/1997 | Kennedy ......................... 55/385.3 |
| 5,674,302 * | 10/1997 | Nakayama et al. ............... 56/385.3 |
| 5,720,790 | 2/1998 | Kometani et al. . |
| 5,725,624 * | 3/1998 | Ernst et al. ........................ 55/502 |
| 5,853,577 * | 12/1998 | Gizowski et al. .................. 55/511 |
| 5,888,442 | 3/1999 | Kometani et al. . |
| 6,045,600 * | 4/2000 | Michaelis et al. ................ 55/502 |

FOREIGN PATENT DOCUMENTS

| | | |
|---|---|---|
| 196 54 188 A1 | 7/1997 | (DE) . |
| 0 490 169 A1 | 6/1992 | (EP) . |
| 1 367 226 | 9/1974 | (GB) . |
| U-7-27238 | 5/1996 | (JP) . |
| 8-243334 * | 9/1996 | (JP) . |
| 8-257335 | 10/1996 | (JP) . |
| 8-309136 | 11/1996 | (JP) . |

OTHER PUBLICATIONS

Jill Journal of Technical Disclosure, No. 96–9626, Aug. 1, 1996, pp. 1.*
Toyota Technical Report No. 6865, May 30, 1997, pp. 261–262.
JIII Journal of Technical Disclosure No. 96–9626, Aug. 1, 1996, PP. 1

* cited by examiner

*Primary Examiner*—Duane Smith
*Assistant Examiner*—Jason M. Greene
(74) *Attorney, Agent, or Firm*—Oliff & Berridge, PLC (57) ABSTRACT

An air filter is substantially made up of a filter element having a pleated filtering portion and a collar portion that extends on an outer periphery of the filtering portion and that has a sealing function, the filtering portion and the collar portion being integrally formed from the same material, and a cap and a case each of which has a flange for clamping the collar portion of the filter element. One of the flange of the cap and the flange of the case has a protruded portion that has an inclined portion. The collar portion of the filter element has a recess portion that contacts the inclined portion of the protruded portion and is guided by the inclined portion and fits to the protruded portion at a predetermined position so as to become set in position.

16 Claims, 8 Drawing Sheets

AIR FILTER

INCORPORATION BY REFERENCE

The disclosure of Japanese Patent Application No. HEI 10-235934 filed on Aug. 21, 1998 including the specification, drawings and abstract is incorporated herein by reference in its entirety.

BACKGROUND OF THE INVENTION

1. Field of the Invention

The present invention relates to an air filter usable as a component part of an air cleaner that is disposed in an intake system of an internal combustion engine.

2. Description of the Related Art

In normally employed air cleaners, an air filter is firmly retained at a housing position by a construction in which a collar portion of a pleated filter body is clamped by a case and a cap that are detachable from each other. Such air filters are desired to be simply constructed and low-cost. U.S. Pat. No. 5,674,302 discloses a filter in which a pleated filter body and a collar portion (i.e., a portion to be clamped by a case and a cap) are formed from the same material. Japanese Patent Application Laid-Open No. HEI 8-243334 discloses a filter in which a collar portion of a pleated filter body (i.e., a portion to be clamped by a case and a cap) is formed by a hard portion and a soft portion, and the collar portion is clamped in such a manner that the position of the collar portion can be set by using a clamping portion of the case and a clamping portion of the cap. Toyota Technical Report No. 6865, published on May 30, 1997, discloses an air cleaner element mounting construction in which a filter element is mounted between a case and a cap in such a manner that a protrusion formed in a flange (clamping portion) of the cap that faces a clamping portion of the case is fitted to a corrugated portion formed inwardly of a seal portion of the element (i.e., a portion of the element that is clamped by the clamping portion of the case and the flange (clamping portion) of the cap). JIII Journal of Technical Disclosure No. 96-9626, published on Aug. 1, 1996, discloses a construction in which the positioning and sealing of a non-woven fabric-integrated air filter is improved by fitting a protrusion formed in a clamped portion of the air filter into a recess formed in a clamping portion of a case that faces a clamping portion of a cap.

However, the aforementioned air filters have not received consideration regarding prevention of a mounting error that where a filter element is to be mounted at such a position as to divide a space defined by the case and the cap into a dusty side and a clean side, that is, a before-filtration side and an after-filtration side, the filter element is falsely placed in a 180°-reversed orientation so that the dusty and clean sides of the filter element are in the opposite positions (reversed positions). Therefore, the conventional air filters need an improvement in this respect.

SUMMARY OF THE INVENTION

Accordingly, it is an object of the present invention to provide an air filter that has a mounting error preventing function as well as a sealing function and a positioning function.

In accordance with the invention, an air filter includes a filter element having a pleated filtering portion and a collar portion that extends on an outer periphery of the filtering portion and that has a sealing function, the filtering portion and the collar portion being integrally formed from the same material, a cap and a case each of which has a flange for clamping the collar portion of the filter element, a protruded portion formed in one of the flange of the cap and the flange of the case, the protruded portion having an inclined portion, and a recess portion formed in the collar portion of the filter element, the recess portion fitting to the protruded portion at a predetermined position so as to become set in position. One of an inside surface of the recess portion and an outside surface of the recess portion contacts the inclined portion of the protruded portion and is guided by the inclined portion. The other one of the inside surface and the outside surface is pressed by the protruded portion so as to seal a gap between the protruded portion and the recess portion.

The air filter is mounted so that the air filter is housed between the case and the cap.

In a mounting procedure, the collar portion of the filter element is pressed from above by the flange of the cap while a lower surface side of the collar portion is placed on the flange of the case.

As a result, the recess portion of the collar portion of the filter element moves along the inclined portion of the protruded portion of the flange of the case, and is guided to a predetermined position, where the recess portion fits to the protruded portion. Thus, the filter element can be quickly set in position.

That is, the air filter is designed so that the filter element cannot be mounted unless the recess portion of the collar portion of the filter element is guided by the inclined portion of the protruded portion formed in one of the flange of the case and the flange of the cap. Therefore, this design prevents a mounting error that where the filter element is to be mounted at such a position as to divide a space defined by the case and the cap into a dusty side and a clean side, that is, a before-filtration side and an after-filtration side, the filter element is falsely placed in a 180°-reversed orientation so that the dusty and clean sides of the filter element are in the opposite positions (reversed positions).

After the filter element is set at the predetermined position, the collar portion of the filter element is clamped by the flange of the cap and the flange of the case, and thereby fixed and retained.

In the air filter of the invention, the filtering portion and the collar portion, formed from the same material, may contain a low-melting point resin fiber.

If the collar portion containing the low-melting point resin fiber is thermally pressed, the distortion in the collar portion can be reduced, and the contact surfaces where the collar portion is clamped by the flange of the cap and the flange of the case can be flattened, and the sealing can be improved.

The aforementioned one of the inside surface and the outside surface of the recess portion may have, in a region where the one contacts the inclined portion, a hard portion formed by thermally compressing a low-melting point resin fiber.

In this construction, the hard portion in the recess portion of the collar portion of the filter element more readily slides along the inclined portion of the protruded portion, so that the air filter can be more quickly set in position. Furthermore, after the recess portion of the collar portion of the filter element is guided to the predetermined position by the inclined portion of the protruded portion of the flange of the case, a non-hard portion (soft portion) formed in the recess portion is pressed by the protruded portion, thereby establishing a sealed condition. Since the sealed condition can be maintained, good sealing can also be maintained.

The other one of the inside surface and the outside surface of the recess portion may have, in a region where the other one is pressed by the protruded portion, a soft portion that is thicker than the hard portion.

When the soft portion is clamped by the flange of the cap and the flange of the case, the margin for compression increases because the soft portion is thicker than the hard portion. Therefore, the amount of elastic deformation increases and, therefore, the elastic reaction or restoration force increases, so that the sealing further improves.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A first embodiment of the air filter of the present invention will be described with reference to FIGS. 1 through 3.

Figure 1:
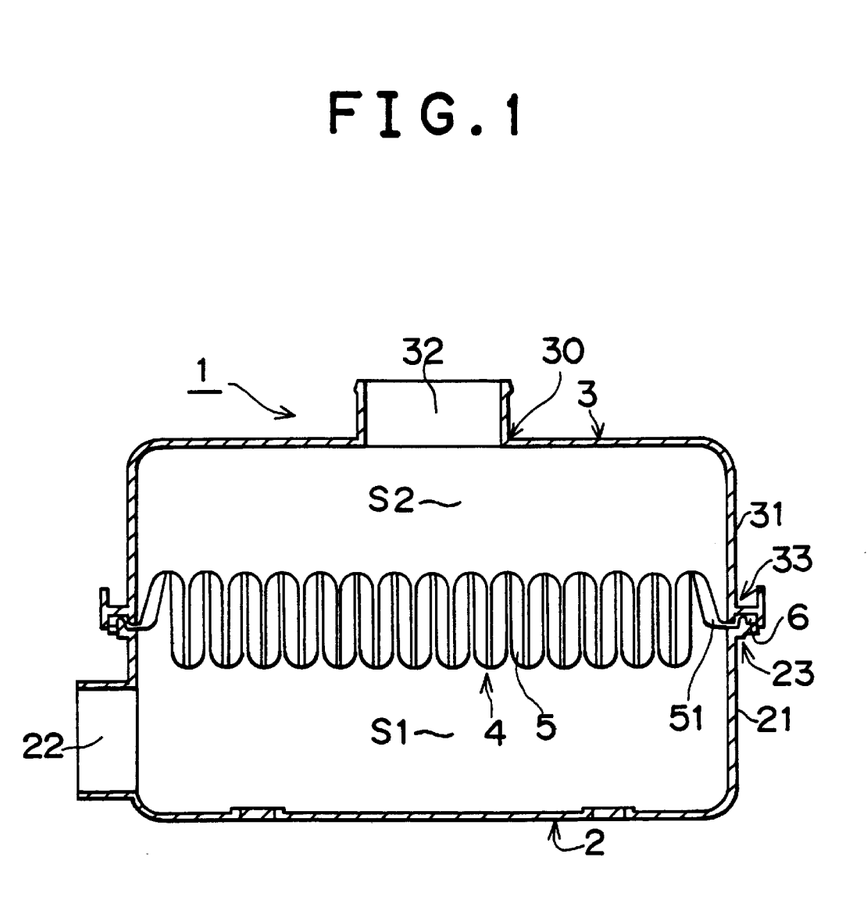
FIG. 1 is a sectional view of an air filter according to a first embodiment of the invention in a ready-for-use state, where a collar portion of a filter element is clamped by a flange of a cap and a flange of a case.

Referring to FIG. 1, an air filter 1 is substantially made up of a case 2 and a cap 3 that are detachable from each other, and a filter element 4 that is clamped by the case 2 and the cap 3 and mounted at such a position as to divide an internal space defined by the case 2 and the cap 3 into a dusty side S1 and a clean side S2, that is, a before-filtration side and an after-filtration side.

The case 2 is a bottomed cylinder-shaped container that is formed from polypropylene (or from an other resin or a metal). The case 2 has a tube-shaped intake air inlet passage 22 extending horizontally from a lower portion of a peripheral wall 21 of the tubular case 2, and a flange 23 extending on an outer peripheral side of an upper end portion of the peripheral wall 21. The flange 23 of the case 2 is provided for mounting the cap 3 and the filter element 4.

Figure 2:
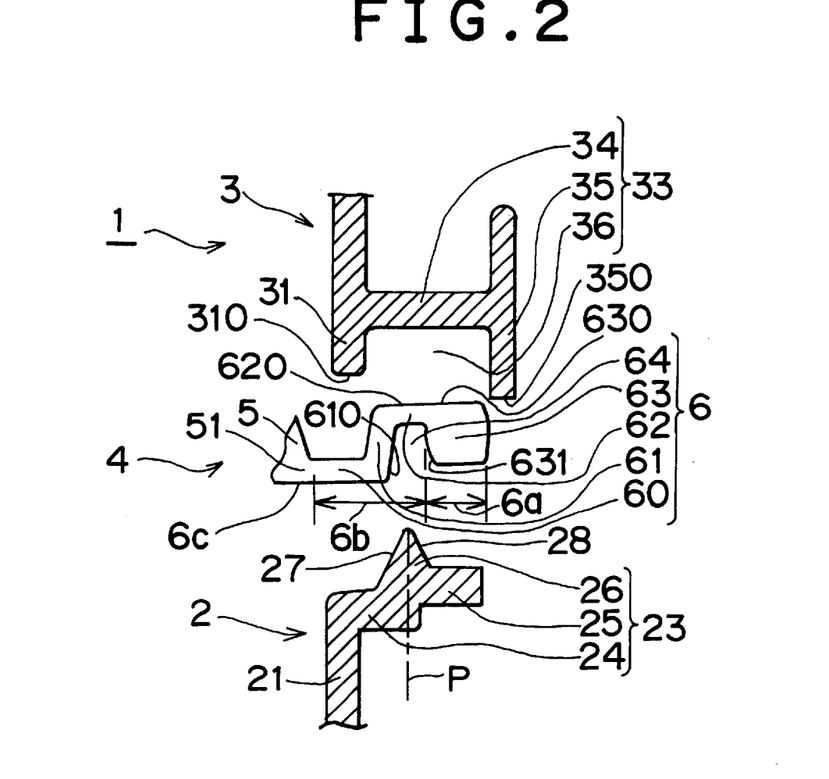
FIG. 2 is an enlarged fragmentary view, where the collar portion of the filter element shown in FIG. 1 is about to be clamped by the flange of the cap and the flange of the case.
Figure 3:
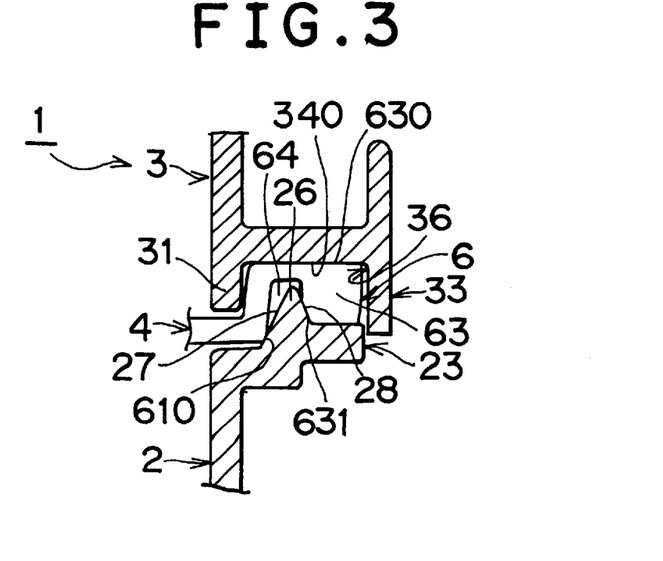
FIG. 3 is an enlarged fragmentary view, where he collar portion of the filter element shown in FIG. 1 is clamped by the flange of the cap and the flange of the case.

As shown in FIG. 2, the flange 23 has a first horizontal portion 24 and a second horizontal portion 25 that are vertically shifted from each other, and a protruded portion 26 protruded from a top surface of the first horizontal portion 24 and a top surface of the second horizontal portion 25 as in a ridge having a generally triangular sectional shape. The protruded portion 26 has on both sides slopes 27, 28 that are at 50° with respect to a perpendicular line P.

The cap 3 is a polypropylene-made cylindrical container having a ceiling portion 30. A tube-shaped intake air outlet passage 32 extends from the ceiling portion 30. A flange 33 extends on an outer peripheral side of a lower end portion of a peripheral wall 31 of the tubular cap 3. The flange 33 is provided for mounting the filter element 4 and the case 2.

As shown in FIG. 2, the flange 33 has a horizontal portion 34 extending outward from the peripheral wall 31, more specifically, from a position that is about 4 mm above a lower end 310 of the peripheral wall 31, and a vertical portion 35 extending vertically from a distal end of the horizontal portion 34. The peripheral wall 31, the horizontal portion 34 and the vertical portion define a housing recess 36 that is open downward. The housing recess 36 is provided with such dimensions as to house and cover a vertical portion 61, a second horizontal portion 62 and a seal portion 63 of a collar portion 6 of the filter element 4 (described below).

The filter element 4 includes a pleated filtering portion 5 formed from a polyethylene terephthalate fiber, and the collar portion 6 formed integrally with the filtering portion 5.

The collar portion 6 includes a first horizontal portion 60 extending horizontally from a periphery portion 51 of the filtering portion 5, a vertical portion 61 extending upward with a slight inclination from the first horizontal portion 60, a second horizontal portion 62 extending horizontally from the vertical portion 61, and a seal portion 63 that is formed on a distal end side of the second horizontal portion 62 and that has an upper surface 630 (a portion that serves as a sealing surface) flush with an upper surface 620 of the second horizontal portion 62. The seal portion 63 is thicker than the second horizontal portion 62. A downwardly open recess 64 is defined by the vertical portion 61, the second horizontal portion 62, and the seal portion 63.

The first horizontal portion 60, the vertical portion 61 and the second horizontal portion 62 of the collar portion 6 are formed as a high-density hard portion 6b using a polyethylene terephthalate. The seal portion 63 of the collar portion 6 is formed as a low-density soft portion 6a using a polyethylene terephthalate.

The width of the opening of the recess portion 64 is less than the width of a base portion of the protruded portion 26 of the flange 23. The depth of the recess portion 64 is set to a sufficiently great depth such that when the protruded portion 26 fits into the recess portion 64, inner peripheral surfaces 610, 631 of the recess portion contact the slopes 27, 28, respectively, of the protruded portion 26 before a distal end of the protruded portion 26 contacts a bottom portion of the recess portion 64.

During assembly of the air filter 1 of the first embodiment constructed as described above, the collar portion 6 of the filter element 4 is clamped between the flange 23 of the case 2 and the flange 33 of the cap 3 in the following manner. That is, a lower surface 6c of the collar portion 6 of the filter element 4 is placed on the flange 23 of the case 2 while the upper surface 620 of the second horizontal portion 62 and the upper surface 630 of the seal portion 63 of the collar portion 6 are covered with and enclosed in the flange 33 of the cap 3.

That is, the housing recess portion 36 formed in the flange 33 of the cap 3 houses and pressurizes the vertical portion 61, the second horizontal portion 62 and the seal portion 63 of the collar portion 6 of the filter element 4.

The collar portion 6 of the filter element 4 can be quickly set to a predetermined position in the following manner. The inner peripheral surface 610 of the vertical portion 61 formed by the high-density hard portion 6b contacts the slope 27 of the protruded portion 26 of the flange 23 of the case 2, and is slidingly guided by the slope 27 in a good and swift manner, so that the recess portion 64 of the collar portion 6 becomes engaged with the protruded portion 26 of the case 2. After being mounted to the case 2, the cap 3 is firmly retained thereto by using a fastening member (not shown). The cap 3 prevents thermal shrinkage of the filter element 4.

The air filter 1 is designed so that the filter element 4 cannot be mounted unless the recess portion 64 of the collar portion 6 of the filter element 4 is guided by the slope 27 of the protruded portion 26 formed in the flange 23 of the case 2. Therefore, this design prevents a mounting error that where the filter element 4 is to be mounted at such a position as to divide a space defined by the case 2 and the cap 3 into a dusty side S1 and a clean side S2, that is, a before-filtration side and an after-filtration side, the filter element 4 is falsely placed in a 180°-reversed orientation so that the dusty and clean sides of the filter element are in the opposite positions (reversed positions).

The air filter 1 of the first embodiment thus eliminates the error of reversed mounting, which often occurs in the case of conventional filter elements having flat flanges. The air filter 1 of the first embodiment also ensures reliable fixation and retainment of the filter element to a predetermined position. The embodiment thus improves the assembling efficiency.

Furthermore, the seal portion 63 of the collar portion 6 of the filter element 4 is formed by the low-density soft portion 6a. Therefore, when pressed by the flange 33 of the cap 3, the seal portion 63 elastically deforms, so that the inner peripheral surface 631 of the recess portion 64 of the collar portion 6 closely contacts the slope 28 of the protruded portion 26 of the flange 23 of the case 2 due to the elastic restoration force of the seal portion 63 produced in accordance with the pressing force of the flange 33 of the cap 3. Thus, the sealing characteristic improves.

The sealing characteristic also improves because the slopes 27, 28 of the protruded portion 26 contact the inner peripheral surfaces 610, 631 of the recess portion 64 from different sides. If the filter element 4 thermally shrinks during operation of the air filter 1, a force occurs that moves the collar portion 6 of the filter element 4 in a horizontal direction in FIG. 3. No matter whether the collar portion 6 shifts rightward or leftward in FIG. 3, one of the inner peripheral surfaces 610, 631 of the recess portion 64 is further pressed by the protruded portion 26 since the inner peripheral surfaces 610, 631 contact different sides of the protruded portion 26. Therefore, deterioration of the sealing characteristic is curbed.

When the filter element 4 has been mounted as described above, firm retainment of the filter element 4 is established. That is, an upper portion of the collar portion 6 of the filter element 4 is disposed and retained in the housing recess 36 of the flange 33 of the cap 3 while the recess 64 of the collar portion 6, that is, a lower portion thereof, is fitted over the protruded portion 26 of the case 2. Therefore, deviation of the collar portion 6 of the filter element 4 from the predetermined position will be prevented, and good sealing condition at the predetermined position will be maintained.

Figure 4:
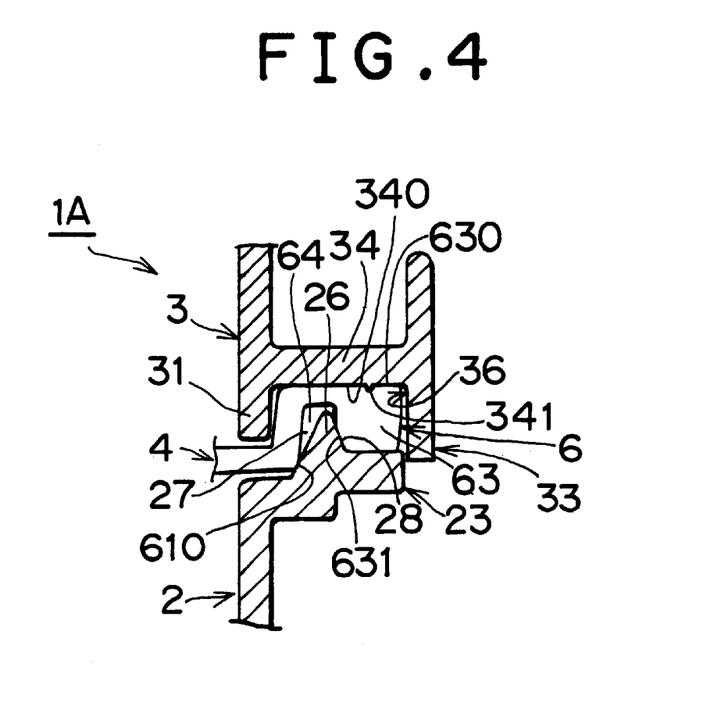
FIG. 4 is an enlarged fragmentary view, where the collar portion of the filter element is clamped by the flange of the cap and the flange of the case according to a second embodiment of the invention.

FIG. 4 shows a second embodiment of the invention. An air filter 1A of the second embodiment has substantially the same construction as the air filter 1 of the first embodiment, except that a small protrusion 341 is provided on a lower end surface 340 of a horizontal portion 34 of a flange 33 of a cap 3.

In the air filter 1A of the second embodiment, the small protrusion 341 is pressed into the upper surface 630 of the seal portion 63 of the collar portion 6 of the filter element 4. Therefore, the air filter 1A of the second embodiment improves the sealing, besides achieving substantially the same advantages as those achieved by the air filter 1 of the first embodiment.

Figure 5:
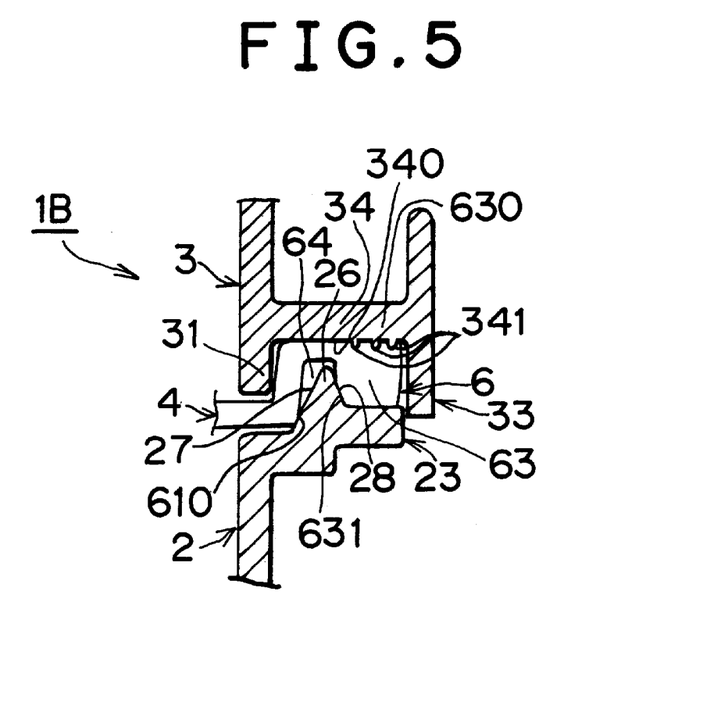
FIG. 5 is an enlarged fragmentary view, where the collar portion of the filter element is clamped by the flange of the cap and the flange of the case according to a third embodiment of the invention.

FIG. 5 shows a third embodiment of the invention. An air filter 1B of the third embodiment has substantially the same construction as the air filter 1A, except that a plurality of small protrusions 341 are provided on a lower end surface 340 of a horizontal portion 34 of a flange 33 of a cap 3.

In the air filter 1B of the third embodiment, the plurality of small protrusions 341 are pressed into the upper surface 630 of the seal portion 63 of the collar portion 6 of the filter element 4. Therefore, the air filter 1B of the third embodiment improves the sealing, besides achieving substantially the same advantages as those achieved by the air filter 1 of the first embodiment.

Figure 6:
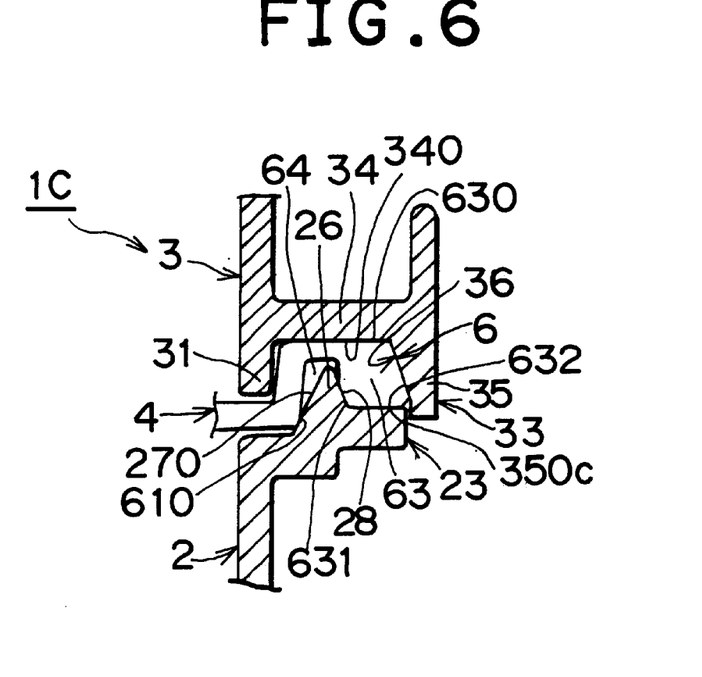
FIG. 6 is an enlarge fragmentary view, where the collar portion of the filter element is clamped by the flange of the cap and the flange of the case according to a fourth embodiment of the invention.

FIG. 6 shows a fourth embodiment of the invention. An air filter 1C of the fourth embodiment has substantially the same construction as the air filter 1 of the first embodiment, except that a vertical portion 35 of a flange 33 of a cap 3 has an inclined surface 350c on a side of a housing recess 36.

In the air filter 1C of the fourth embodiment, the inclined surface 350c of the flange 33 of the cap 3 is pressed against the outer peripheral surface 632 of the seal portion 63 of the collar portion 6 of the filter element 4, and the outer peripheral surface 632 of the seal portion 63 is thereby elastically deformed to produce elastic restoration force. Therefore, the air filter 1C of the fourth embodiment improves the sealing, besides achieving substantially the same advantages as those achieved by the air filter 1 of the first embodiment.

Figure 7:
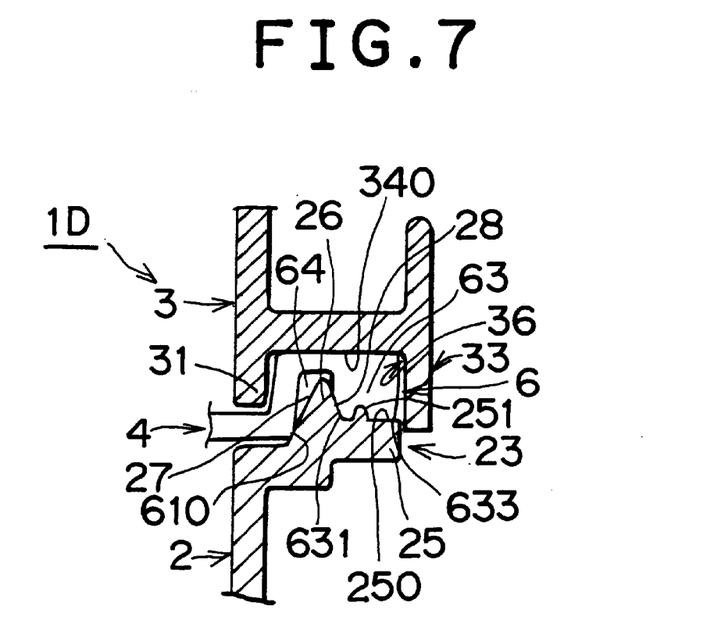
FIG. 7 is an enlarge fragmentary view, where the collar portion of the filter element is clamped by the flange of the cap and the flange of the case according to a fifth embodiment of the invention.

FIG. 7 shows a fifth embodiment of the invention. An air filter 1D of the fifth embodiment has substantially the same construction as the air filter 1 of the first embodiment, except that a small protrusion 251 is provided on an upper surface 250 of a second horizontal portion 25 of a flange 23 of a case 2.

In the air filter 1D of the fifth embodiment, the protrusion 251 is pressed into the lower surface 633 of the seal portion 63 of the collar portion 6 housed in the housing recess 36 of the flange 33 of the cap 3, so as to restrain the seal portion 63 from escaping radially outward during elastic deformation thereof within the housing recess 36. The restraint of the seal portion 63 in this manner correspondingly increases the elastic restoration force of the seal portion 63. Therefore, the air filter iD of the fifth embodiment improves the sealing, besides achieving substantially the same advantages as those achieved by the air filter 1 of the first embodiment.

Figure 8:
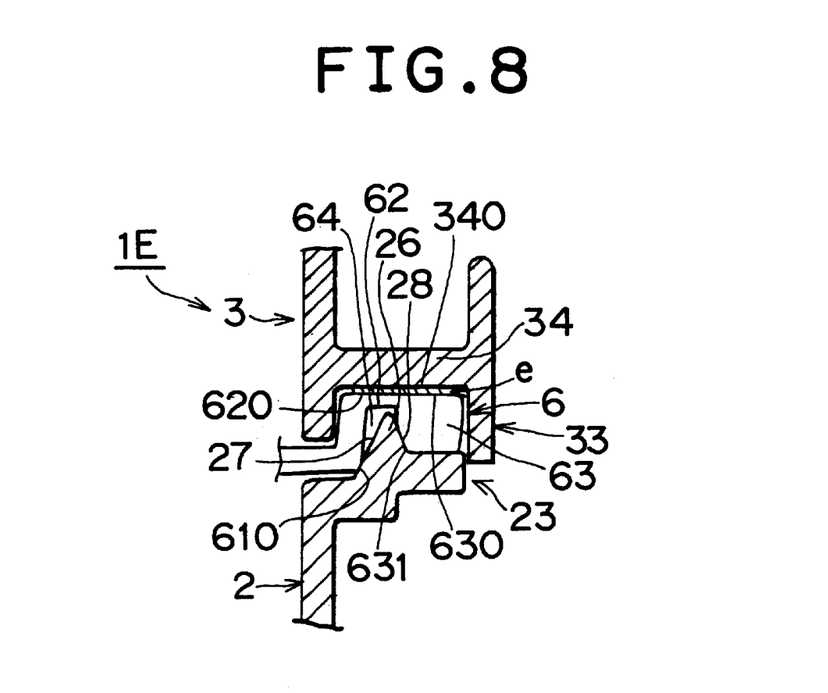
FIG. 8 is an enlarge fragmentary view, where the collar portion of the filter element is clamped by the flange of the cap and the flange of the case according to a sixth embodiment of the invention.

FIG. 8 shows a sixth embodiment of the invention. An air filter 1E of the sixth embodiment has substantially the same construction as the air filter 1 of the first embodiment, except that a sealing material (e.g., an elastomer) e is applied to an upper surface 620 of a second horizontal portion 62 of a collar portion 6 of a filter element 4 and to an upper surface 630 of a seal portion 63 of the collar portion 6 that is flush with the aforementioned upper surface 620.

In the air filter 1E of the sixth embodiment, the lower surface 340 of the horizontal portion 34 of the flange 33 of the cap 3 is closely adhered to the upper surface 620 of the second horizontal portion 62 and the upper surface 630 of the seal portion 63 of the collar portion 6 of the filter element 4 by the sealing material e. Therefore, the air filter 1E of the sixth embodiment improves the sealing, besides achieving substantially the same advantages as those achieved by the air filter 1 of the first embodiment.

Figure 9:
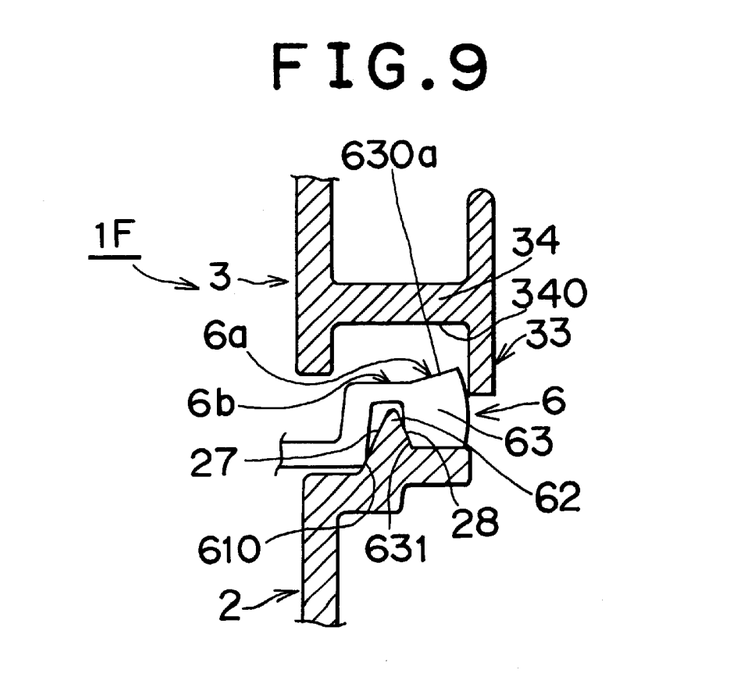
FIG. 9 is an enlarge fragmentary view, where the collar portion of the filter element is clamped by the flange of the cap and the flange of the case according to a seventh embodiment of the invention.

FIG. 9 shows a seventh embodiment of the invention. An air filter 1F of the seventh embodiment has substantially the same construction as the air filter 1 of the first embodiment, except that a seal portion 63 of a collar portion 6 of a filter element 4 has a sloped upper surface 630a.

In the air filter 1F of the seventh embodiment, the sloped upper surface 630a of the seal portion 63 of the filter element 4 is elastically deformed to assume a horizontal plane by the lower end surface 340 of the horizontal portion 34 of the flange 33 of the cap 3, thus producing elastic restoration force. Furthermore, since the soft portion 6a of the collar portion 6 of the filter element 4 is protruded toward the lower end surface 340 of the flange 33 of the cap 3 in comparison with the hard portion 6b of the collar portion 6, the soft portion 6a can be reliably compressed by the lower end surface 340, so that the soft portion 6a closely contacts the flange 33 of the cap 3. The air filter 1F of the seventh embodiment thus improves the sealing, besides achieving substantially the same advantages as those achieved by the first embodiment.

Figure 10:
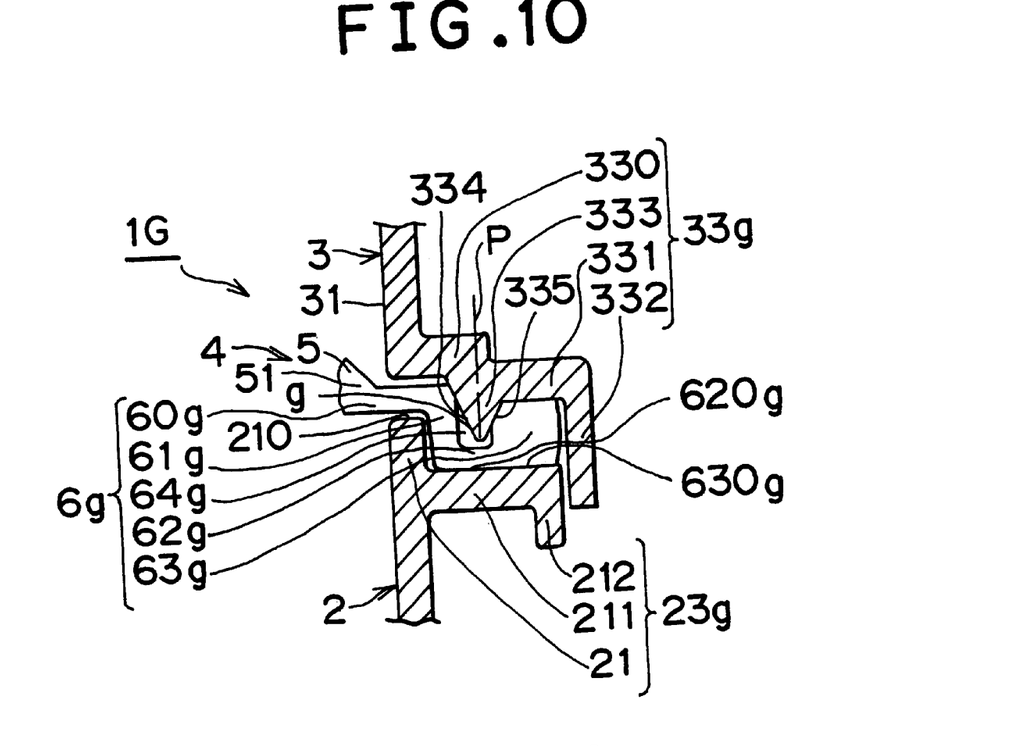
FIG. 10 is an enlarged fragmentary view, where the collar portion of the filter element is clamped by the flange of the cap and the flange of the case according to an eighth embodiment of the invention.

FIG. 10 shows an air filter 1G of an eighth embodiment. The air filter 1G has substantially the same construction as the air filter 1 of the first embodiment, except that the air filter 1G of the eighth embodiment has a vertically inverted clamping structure in comparison with that of the air filter and that a sealing material g is used.

In the air filter 1G of the eighth embodiment, a flange 23g formed in a case 2 includes a peripheral wall 21 of the case 2, a horizontal portion 211 protruded outward from the peripheral wall 21, more specifically, from a portion thereof slightly below an upper end 210 of the peripheral wall 21, and a vertical portion 212 extending vertically down from the horizontal portion 211.

A flange 33g formed in a cap 3 includes a first horizontal portion 330 and a second horizontal portion 331 that are provided radially outwardly of a peripheral wall 31 of the cap 3 and that are vertically shifted from each other, a protruded portion 333 protruded from a lower surface of the first horizontal portion 330 and a lower surface of the second horizontal portion 331 as in an inverted ridge having a generally triangular sectional shape, and a vertical portion 332 extending vertically down from the second horizontal portion 331. The protruded portion 333 has on both sides sloped surfaces 334, 335 that are at 50° with respect to a perpendicular line P.

A collar portion 6g formed integrally with a filtering portion 5 of a filter element 4 includes a first horizontal portion 60g extending horizontally from a periphery portion 51 of the filtering portion 5, a vertical portion 61g extending vertically downward from the first horizontal portion 60g, a second horizontal portion 62g extending horizontally from the vertical portion 61g, and a relatively thick seal portion 63g that is formed on a distal end side of the second horizontal portion 62g and that has a lower surface 630g (a portion that serves as a sealing surface) flush with a lower surface 620g of the second horizontal portion 62g. An upwardly open recess 64g is defined by three portions of the collar portion 6g, that is, the vertical portion 61g, the second horizontal portion 62g, and the seal portion 63g.

The first horizontal portion 60g, the vertical portion 61g and the second horizontal portion 62g of the collar portion 6g are formed as a high-density hard portion 6b using a polyethylene terephthalate. The seal portion 63g of the collar portion 6g is formed as a low-density soft portion 6a using a polyethylene terephthalate.

In the air filter 1G of the eighth embodiment, the collar portion 6g formed integrally with the filtering portion 5 of the filter element 4 is surrounded and restrained by the peripheral wall 21 and the horizontal portion 211 of the case 2, and the first horizontal portion 330, the second horizontal portion 331, the vertical portion 332 and the protruded portion 333 of the cap 3. At least a portion of the protruded portion 33 fitted into the recess 64g is kept buried in the sealing material g disposed in the recess 64g. The air filter 1G of the eighth embodiment thus improves the sealing, besides achieving substantially the same advantages as those achieved by the air filter 1 of the first embodiment.

Figure 11:
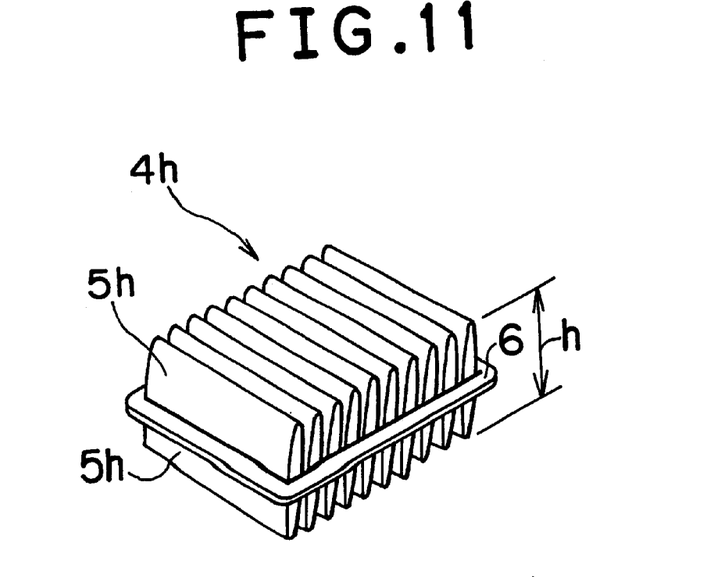
FIG. 11 is a perspective view of a filter element employed in a ninth embodiment of the invention.

FIG. 11 shows a ninth embodiment of the invention. A filter element 4h employed in the ninth embodiment has substantially the same construction as the filter element 4 employed in the air filter 1 of the first embodiment, except that a collar portion 6 extends along sides of a filtering portion 5h, at half the height h of the filtering portion 5h as indicated in FIG. 11.

An air filter 1H (not shown) employing the filter element 4h of the ninth embodiment also achieves substantially the same advantages as those achieved by the air filter 1 of the first embodiment.

Figure 12:
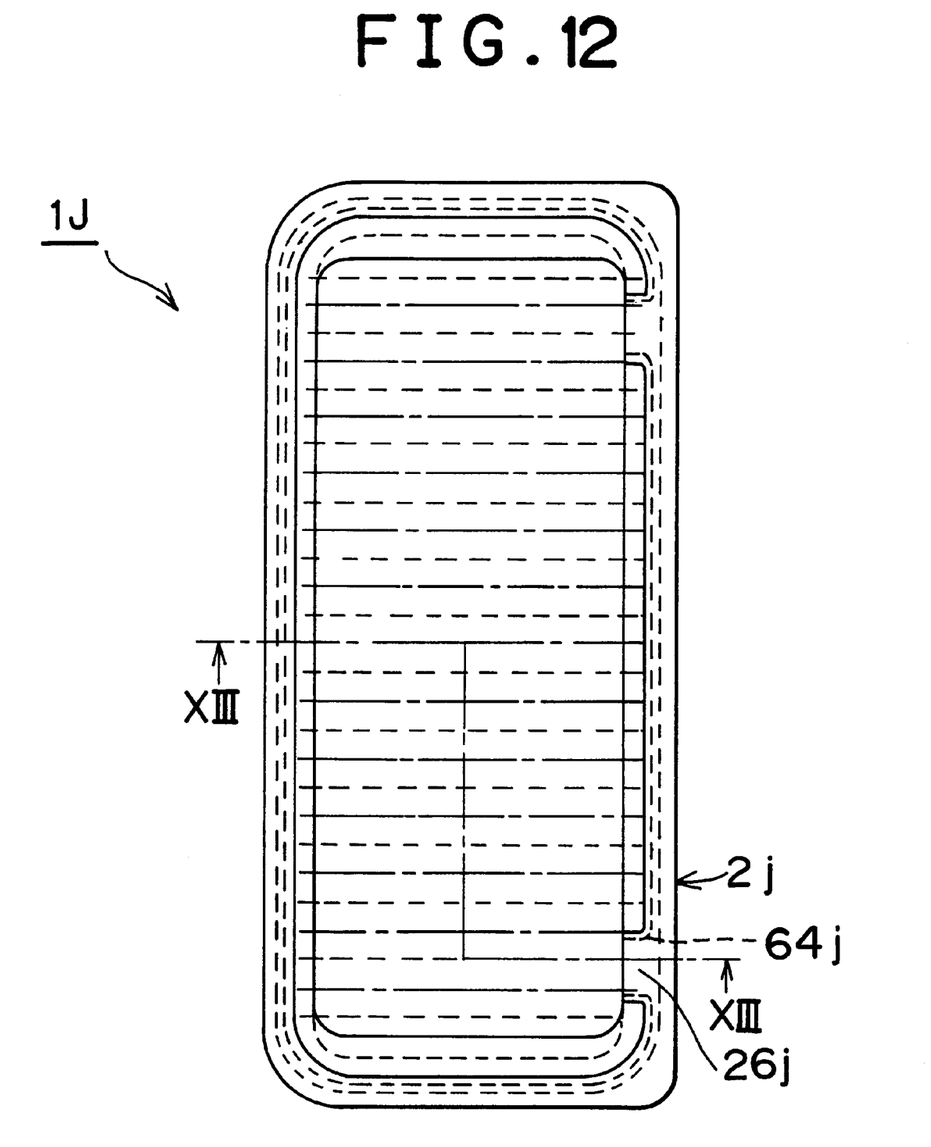
FIG. 12 is a plan view of a filter element employed in a tenth embodiment of the invention.
Figure 13:
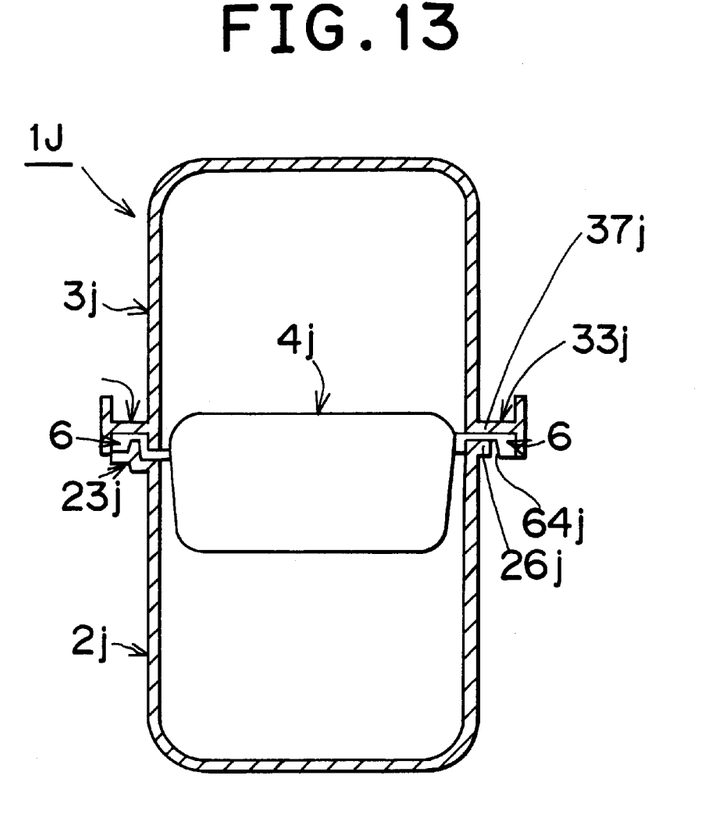
FIG. 13 is a sectional view taken on line XIII—XIII in FIG. 12.

FIGS. 12 and 13 show a tenth embodiment of the invention. An air filter 1J of the tenth embodiment has substantially the same construction as the air filter 1 of the first embodiment, except that a depleted portion or cutout 37j is formed in a portion of a flange 33j of a cap 3j, and a protrusion 26j is formed in a flange 23j of a case 2j at such a position as to face the cutout 37j, and a portion of a collar portion 6 of a filter element 4j is modified in shape so as to form a recess 64j that fits to the cutout 37j and the protrusion 26j, in order to prevent the mis-mounting of the filter element 4j.

The air filter 1J of the tenth embodiment also achieves substantially the same advantages as those achieved by the air filter 1 of the first embodiment.

Figure 14:
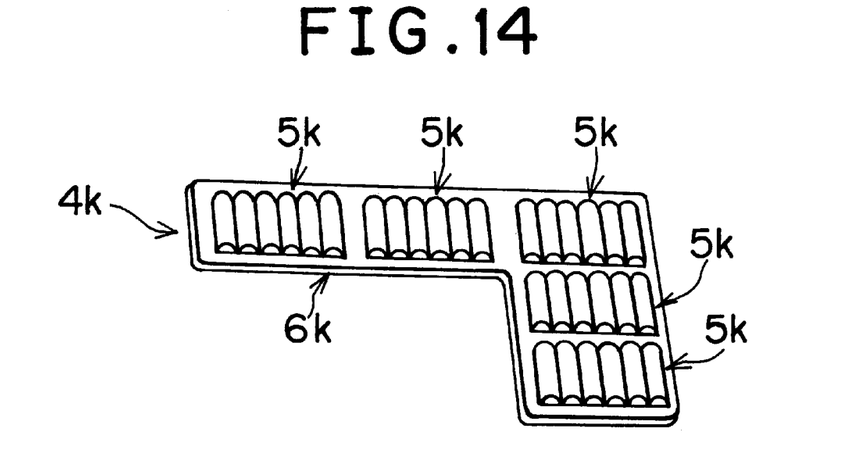
FIG. 14 is a perspective view of a filter element employed in an eleventh embodiment of the invention.

FIG. 14 shows an eleventh embodiment of the invention. A filter element 4k employed in the eleventh embodiment has substantially the same construction as the filter element 4 employed in the air filter 1 of the first embodiment, except that the filter element 4k of the eleventh embodiment has a special configuration (i.e., a generally inverted "L" shape when viewed from a front side) in which a plurality of smaller divisions of pleated filtering portions 5k are arranged and then thermally fused to one another so that the filtering portions 5k are joined into an integral filter with a collar portion 6k extending along an outer periphery of the filter.

An air filter (not shown) employing the filter element 4k of the eleventh embodiment also achieves substantially the same advantages as those achieved by the air filter 1 of the first embodiment.

The configuration of the filter element 4k is not limited to the above-described configuration. A plurality of filtering portions 5k may be arranged into any desired configuration, and then joined to one another by thermal fusion into an integral filter.

When an air filter according to the invention as described above is mounted between the case and the cap, the collar portion of the filter element is supported at its lower side by the flange of the case, and is pressed from above by the flange of the cap. In response, the recess portion of the collar portion of the filter element moves along a sloped portion of the protrusion of the flange of the case, and becomes engaged with the protrusion at a predetermined position. Therefore, the filter element can be quickly positioned. After the filter element has been positioned, the cap is fixed and retained, thereby preventing thermal shrinkage of the filter element.

The filter element in the invention is designed so that the filter element cannot be mounted unless the recess portion of the collar portion of the filter element is guided by the sloped portion of the protrusion that is formed on one of the flange of the case and the flange of the cap. This design therefore prevents the mounting error that where a filter element is to be mounted at such a position as to divide a space defined by the case and the cap into a dusty side and a clean side, that is, a before-filtration side and an after-filtration side, the filter element is falsely placed in a 180°-reversed orientation so that the dusty and clean sides of the filter element are in the opposite positions (reversed positions).

Thus, the air filter of the invention eliminates the error of reversed mounting, which often occurs in the case of conventional filter elements having flat flanges. The air filter of the invention also ensures reliable fixation and retainment of the filter element to a predetermined position, thereby improving the assembling efficiency.

The foregoing embodiments may use a mixture of a high-melting point fiber and a low-melting point fiber as a material for integrally forming the pleated filtering portion and the collar portion extending around the filtering portion.

For example, a high-melting point fiber and a low-melting point fiber are mixed and formed into a mat. After the mat is pleated, a central portion of the mat is held by a die. Then, the mat is heated to a temperature at which only the low-melting point fiber in the peripheral end portion of the mat melts. The peripheral end portion is then compressed to form a collar portion.

As for a material for forming the filter element, a non-woven fabric formed from a polyester may be used.

A peripheral end portion of a filter element formed only from a non-woven fabric may be trimmed or cut. If a method, for example, a stamping method using a Thomson blade, or a cutting method using a shear blade, is employed for the trimming, fibers of the non-woven fabric may ravel at a trimmed surface. The problem of raveling can be eliminated by employing a melt-cut method.

A polyester fiber may be used as a low-melting point resin fiber contained in the filter element.

The protrusion formed on one of the flange of the cap and the flange of the case has an inclined portion. Therefore, when the filter element is mounted, the recess portion formed in the collar portion of the filter element is brought into the contact with the inclined portion of the protrusion. The recess portion is guided by the inclined surface until the recess portion becomes joined with the protrusion at a predetermined position. The filter element is thus positioned.

The recess portion of the collar portion of the filter element may have such a configuration that the recess portion can readily contact the inclined portion of the protrusion and can be smoothly guided and positioned by the inclined portion. For example, the recess portion of the collar portion of the filter element may have an inclined portion that has the same inclination angle as the inclined portion of the protrusion does and that faces the inclined portion of the protrusion when the filter element is mounted.

The filter element may have a square or rectangular shape, or a shape other than rectangle, a special shape, or the like. A special shape of a filter element maybe formed by, for example, arranging a plurality of small divisions of pleated filtering portions into an intended shape, and then joining them by thermal fusion. A special shape of a filter element may also be formed by a press method.

If a seal surface of the collar portion is formed by heat-pressing a pleated non-woven cloth, creases may be formed on the seal surface so that the sealing will deteriorate, because there is no direction specificity in the flattening of the pleated non-woven cloth, or because the joining force between ridges of the pleated non-woven cloth. Therefore, it becomes important to reduce the incidence of such creases. Consequently, it is preferable to reduce the incidence of creases in a seal surface of a pressed pleated non-woven cloth by separately heat-fusing a non-woven cloth for sealing.

In this construction, a hard portion and a soft portion on a seal side are pressed in a flush surface manner so as to avoid forming a step between the two portions, thereby preventing occurrence of creases.

The aforementioned non-woven fabric seal material may be replaced by other kinds of seal materials. For example, a urethane or an elastomer may be injected into a mold during the molding of a filter element, so that a urethane or elastomer seal portion may be formed together with the filter element. A urethane or elastomer seal portion may also be separately prepared and adhered to a filter element.

A seal surface of the collar portion on which a non-woven fabric seal material may be burned (burned for balling) to form fiber balls on the seal surface. Therefore, the joining force between the non-woven fabric seal material and the seal surface of the collar portion will be increased by entangling fibers of the non-woven fabric seal material with fiber balls on the seal surface.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. An air filter comprising:
   a filter element having a pleated filtering portion and a collar portion that extends on an outer periphery of the filtering portion and that has a sealing function, the filtering portion and the collar portion being integrally formed from a same material;

a cap and a case each of which has a flange for clamping the collar portion of the filter element;

a protruded portion formed in one of the flange of the cap and the flange of the case, the protruded portion having a first inclined portion; and a recess portion formed in the collar portion of the filter element, the recess portion fitting to the protruded portion at a predetermined position so as to become set in position, wherein one of an inside surface of the recess portion and an outside surface of the recess portion contacts the first inclined portion of the protruded portion and is guided by the first inclined portion, and the other one of the inside surface and the outside surface is pressed by the protruded portion so as to seal a gap between the protruded portion and the recess portion.

2. An air filter according to claim 1, wherein the protruded portion has a second inclined portion that presses said other one of the inside surface and the outside surface of the recess portion.

3. An air filter according to claim 2, wherein an angle between the first inclined portion and the second inclined portion is defined such that when the recess portion fits to the protruded portion, both the inside surface and the outside surface of the recess portion contacts the protruded portion before a distal end of the protruded portion contacts a bottom portion of the recess portion.

4. An air filter according to claim 3, wherein a width of an opening of the recess portion is less than a width of a base portion of the protruded portion.

5. An air filter according to claim 1, wherein said one of the inside surface and the outside surface of the recess portion has, in a region where said one contacts the first inclined portion, a hard portion formed by thermally compressing a low-melting point resin fiber.

6. An air filter according to claim 5, wherein said other one of the inside surface and the outside surface of the recess portion has, in a region where said other one is pressed by the protruded portion, a soft portion that is thicker than the hard portion.

7. An air filter according to claim 1, wherein the filtering portion and the collar portion contain a low-melting point resin fiber.

8. An air filter according to claim 7, wherein said one of the inside surface and the outside surface of the recess portion has, in a region where said one contacts the first inclined portion, a hard portion formed by thermally compressing a low-melting point resin fiber.

9. An air filter according to claim 8, wherein said other one of the inside surface and the outside surface of the recess portion has, in a region where said other one is pressed by the protruded portion, a soft portion that is thicker than the hard portion.

10. An air filter according to claim 1, wherein the filter element has, outwardly of the recess portion, a seal portion that is thicker than a portion that forms the recess portion.

11. An air filter according to claim 10, wherein at least one of the cap and the case has a protrusion that is protruded toward the filter element and that is pressed into the seal portion.

12. An air filter according to claim 10, wherein at least one of the cap and the case has an inclined surface that is inclined with respect to a mounting direction of the cap and the case and that contacts the seal portion.

13. An air filter according to claim 10, wherein the filter element has an inclined surface that is inclined so that a thickness of the seal portion increases as a distance from the recess portion increases.

14. An air filter according to claim 1, wherein a sealing material is applied between the filter element and at least one of the cap and the case.

15. An air filter according to claim 1, wherein the collar portion of the filter element is formed on a peripheral side portion of the filtering portion, substantially at a middle of a height of the filtering portion.

16. An air filter according to claim 1, wherein said one of the flange of the cap and the flange of the case has a depleted portion where the protruded portion is partially depleted, and wherein the other one of the flange of the cap and the flange of the case has a protruded portion that faces the depleted portion, and wherein the filter element has a recess portion that fits to the depleted portion and the protruded portion facing the depleted portion.

* * * * *